United States Patent

[11] 3,629,818

| [72] | Inventors | Teruo Hirama<br>Yokohama;<br>Yukio Yamamoto, Ohmiya, both of Japan |
|---|---|---|
| [21] | Appl. No. | 872,139 |
| [22] | Filed | Oct. 29, 1969 |
| [45] | Patented | Dec. 21, 1971 |
| [73] | Assignee | Nissan Motor Company, Limited<br>Yokohama, Japan |
| [32] | Priority | Nov. 12, 1968 |
| [33] | | Japan |
| [31] | | 43/98040 |

[54] ANTITHEFT DEVICE FOR A MOTOR VEHICLE
3 Claims, 9 Drawing Figs.

[52] U.S. Cl. ................................................. 340/64,
70/252, 180/114, 307/10 AT, 340/52 D
[51] Int. Cl. ........................................................ B60r 25/02
[50] Field of Search .......................................... 340/63, 52
D, 64; 70/252; 180/114; 307/10 AT; 200/61.67,
61.81, 61.74, 61.68

[56] References Cited
UNITED STATES PATENTS

| 1,568,509 | 1/1926 | Kolling et al. | 340/64 |
| 1,660,931 | 2/1928 | Mather et al. | 70/252 |
| 1,686,032 | 10/1928 | Randon et al. | 200/61.74 |
| 2,742,630 | 4/1956 | Muncheryan | 340/52 D |
| 3,251,971 | 5/1966 | Fraser | 200/61.81 |

*Primary Examiner*—Donald J. Yusko
*Assistant Examiner*—Glen R. Swann, III
*Attorneys*—Robert E. Burns and Emmanuel J. Lobato ABSTRACT: An antitheft device for a motor vehicle, which device is a combination of steering shaft locking means and two switches operated by the motion of the locking means. One of the switches is closed only when the door is opened and the other when the steering shaft is not ready to be locked so that the alarming means, which may actually be an alarming light or buzzer, becomes operative if and only if the door is opened when the locking means is held in the unlocking positions.

ANTITHEFT DEVICE FOR A MOTOR VEHICLE

This invention relates to an antitheft device for a motor vehicle and, more particularly, , to an improvement in an antitheft device locking the steering shaft of a motor vehicle when the driver is leaving the vehicle.

The improvement according to this invention is specifically made to the same Applicant's copending U.S. Ser. No. 758,539, filed Sept. 9, 1968.

In the antitheft device disclosed in said copending application, alarm sounds are produced if and as soon as the driver opens the door leaving the steering shaft unlocked. Production of such alarm sounds is effected by the cooperation of steering shaft locking means and an alarm switch associated with the locking means.

It is, however, found that difficulty is still experienced in the antitheft device of this type in that the alarm switch, if it fails to properly cooperate with the locking means, happens to be actuated to produce unwanted alarm sounds although the locking means is ready to assume the locking position at the moment the door is opened. This will invite a feeling of insecurity in the driver and, in a long run, may induce him not to rely upon the performance of the device itself. Thus, the antitheft device may possibly be regarded as useless, although the purpose of preventing a possible theft of the motor vehicle is properly maintained.

This invention contemplates elimination of this difficulty and it is an important object of this invention to provide an improved antitheft or steering lock device offering enhanced reliability.

It is another important object of this invention to provide an antitheft device which operates if, and only if, the door is opened when the steering shaft is left unlocked.

It is still another important object of this invention to provide an antitheft device of the character that the alarm switch is perfectly isolated from the locking means once the locking means is brought into a position to lock the steering shaft.

In order to accomplish these and other objects, the invention uses two different switches connected in series with each other; an alarm switch which is kept closed unless the locking means is held in its locking position and a door switch which is closed only when the door is opened. These two switches cooperate with each other in such a manner as to have alarm sounds produced when the door is opened with the locking means held in is unlocking position.

Now, in the drawings

Figure 1:
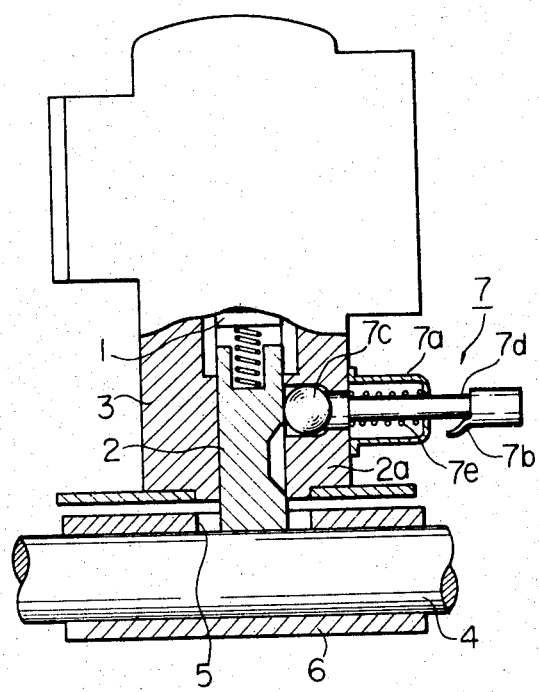
FIG. 1 is a view showing, partly in section, the essential parts of the antitheft device disclosed in the above mentioned Applicant's copending Application.

The antitheft device as disclosed in the aforementioned copending Application, as illustrated, in FIG. 1, has an actuating member 1 which forms part of a key-operated unit (not shown) and assumes different positions depending upon the angular positions of a Key not illustrated, inserted in the key-operated unit. The actuating member 1 in interlocked with a stop claw 2 which is axially slidably accommodated in a cylindrical housing 3. The stop claw 2 is engageable with a steering shaft 4 through a notch 5 provided in a sleeve 6 of the steering shaft depending upon the relative position of the actuating member 1. The stop claw 2 has provided therein a recessed portion 2a for determining the position of an alarm switch which is generally indicated at 7. The alarm switch 7 comprises a stationary contact 7a, a moving contact 7b, a check ball 7c mechanically connected to the moving contact by a rod 7d, and a spring 7e forcing the ball 7lc toward the stop claw 2.

When the actuating member 1 is held in a position to keep the stop claw 2 in locking engagement with the steering shaft 4, then the recessed portion 2a assumes a position past the ball 7c so that the moving contact 7b remains disconnected from the stationary contact 7a. The alarming circuit including a buzzer (not shown) is thus kept open while the actuating member 1 is held in the locking position.

If, on the other hand, the key-operated unit is held in a position to release the stop claw 2 from the steering shaft 4, then the recessed portion 2a is moved to a position to receive the ball 7c. The moving contact 7b is, as a consequence, brought into contact with the stationary contact 7a by the action of the spring 7e. This causes the alarming circuit to be closed when the key-operated unit is left in the unlocked position.

It, however, sometimes happens that, if the key is removed from the key-operated unit with the notch 5 not correctly angularly aligned with the stop claw 2, the stop claw is not allowed to reach the steering shaft 4 beyond the sleeve 6. The ball 7c thus remains in the recessed portion 2a and the moving contact is 7b held in contact with the stationary contact 7a. The stop claw 2 in this condition is ready to reach and lock the steering shaft 4 as soon as the steering wheel (not shown) is turned in either direction but, nevertheless, the alarming circuit remains energized to produce alarm sounds uselessly. This will make the driver doubtful of the locking condition of the steering shaft and, as a matter of fact, he will not be sure whether or not he has effected the locking on the steering shaft.

Figure 2:
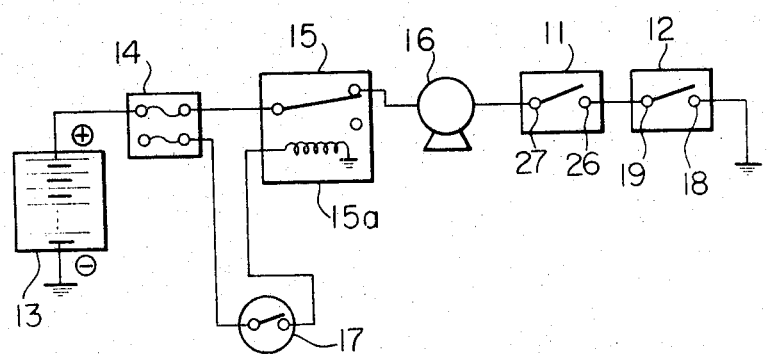
FIG. 2 is a block diagram of the antitheft device according to this invention.

The overall construction arrangement of the antitheft device according to the invention is illustrated in FIG. 2. As shown, the device has an alarm switch 11 and a door switch 12 connected in series with each other. The switches 11 and 12 are powered by a power supply 13 through a fuse box 14, relay switch 15 and alarming means 16 which is actually an alarming light or buzzer. The relay switch 15 has a solenoid coil 15a which is connected with the power supply 13 through an ignition switch 17. When the ignition switch 17 is open, the coil 15a is kept deenergized so that the relay switch 15 is closed to connect the alarming light or buzzer 16 to the power supply 13. If, on contrary, the ignition switch 17 is closed to start the engine, the relay switch 15 is closed to disconnect the alarming light or buzzer 16 from the power supply.

The door switch 12, in particular, is kept open when the door is shut and is closed only when the door is opened. The construction of the door switch 12 is illustrated in FIGS. 3a and 3b.

The door switch 12 has a housing 18 which in itself serves as a stationary contact and a member 19 which serves as a moving contact. The moving contact member 19 is mechanically connected by a screw 19a with a spindle 20 made of an electrically insulating material. The spindle 20 is supported in the housing 18 by a spring 21 and is normally force to protrude from the housing by a spring action to keep the contacts 18 and 19 closed, as seen in FIG. 3b.

Figure 3A:
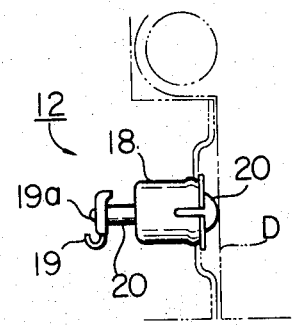
FIG. 3a is a side elevation view of a door switch used in the device of this invention, the switch being shown opened.

When, in operation, the door which is generally represented by "D" is kept closed, as seen in FIG. 3a, the spindle 20 remains retracted in the housing 18 against the action of the spring 21 so that the moving contact member 19 is disconnected from the housing or stationary contact 18. In his condition of the switch 12, the alarming light or buzzer 16 remains inoperative, producing no alarm sounds.

Figure 3B:
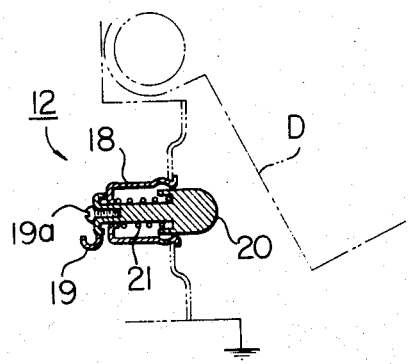
FIG. 3b is a vertical section view of the switch shown in FIG. 3a, the switch being shown closed.

If, now, the door "D" is opened, as shown in FIG. 3b, then the spindle 20 is allowed to protrude from the housing 18 by the action of the spring 21, permitting the moving contact member 19 to abut to the housing or stationary contact 18. Thus, the alarming light or buzzer 16 is energized from the power supply 13 inasmuch as the alarm relay 15 and alarm switch 11 are kept closed.

This alarm switch 11 has a base member 22 made of rigid and electrically insulating material. The base member 22 has formed substantially centrally therein a suitably configured recess or depression. This recess or depression is closed by a faceplate 23. In the wall of this faceplate 23 are mounted a plunger 24 which is movable therethrough and a leaf spring 25 which is anchored at one end to the faceplate. The leaf spring 25 is normally forced away from the faceplate 23, as seen in FIG. 4b. In the space defined by the reverse side of the faceplate and the recess of the base member 22 are accommodated a stationary contact 26 and a moving contact 27. The stationary contact 26 is secured to the inner wall of the base member 22 and is connected to a terminal 26a which is connected to the moving contact 19 of the door switch 12. The moving contact 27 is secured at one end to the inner wall of the base member 22 and is at the other left free. The moving contact 27 is held in contact with the inner end of the plunger 24 and is connected with a terminal 27a which, in turn, is connected to the alarming light or buzzer 16.

Figure 4A:
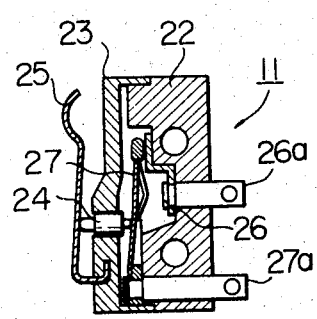
FIGS. 4a and 4b are section views of an alarm switch used in the device of this invention, the switch being shown closed and opened, respectively.
Figure 4B:
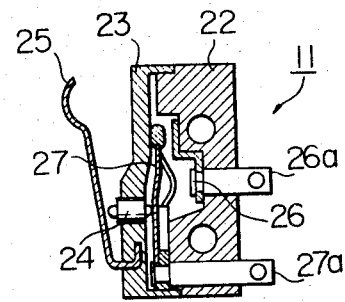

When, in operation, the leaf spring 25 is forced toward the faceplate 23, then the plunger 24 is moved to bring the movable contact 25 in contact with the stationary contact 26 with the result that the switch 11 is closed, as shown in FIG. 4a. When the leaf spring 25 is released from the external pressure, as seen in FIG. 4b, the plunger 24 moves toward the leaf spring 25 so that the moving contact 25 leaves the stationary contact 26, causing the switch 11 to open. In this condition of the switch 11, the alarming light or buzzer 16 is kept inoperative.

Figure 5A:
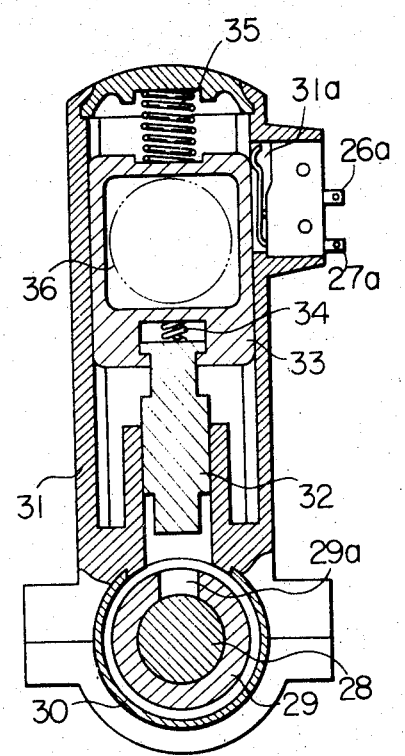
FIGS. 5a and 5b are vertical sectional views of the antitheft device according to this invention, the device being shown as in its unlocking and locking positions, respectively.
Figure 5B:
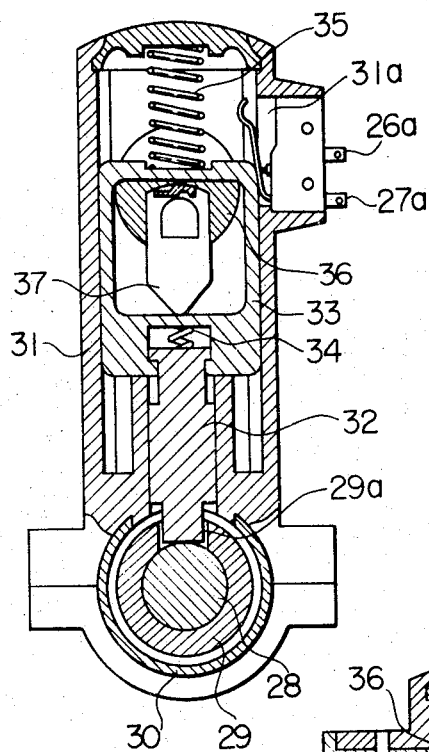
Figure 6:
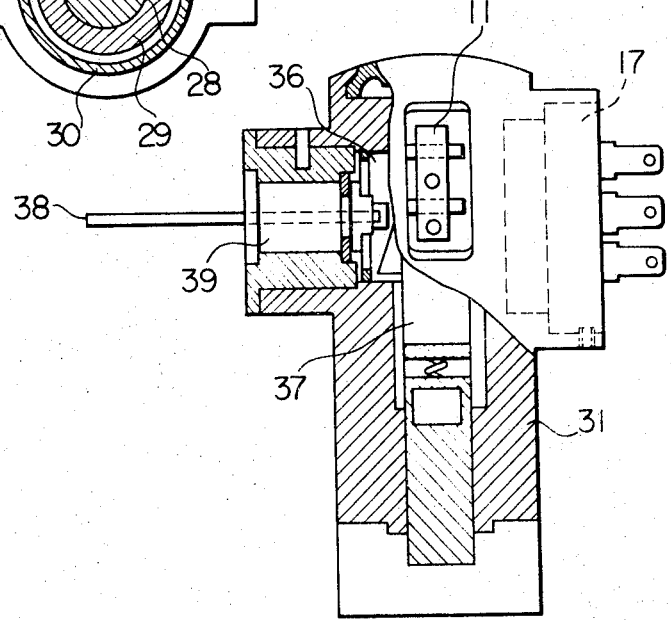
FIG. 6 is a view showing, partially in section, the essential parts of the device shown in FIG. 5b on an enlarged scale.

The alarm switch 11 so constructed is used in the antitheft device according to the invention in a manner shown in FIGS. 5a and 5b and FIG. 6.

Referring to FIGS. 5a and 5b, the antitheft device of this invention is intended to be used with a steering lock device to lock the steering shaft 28 of the steering system of a motor vehicle. The steering shaft 28 is, as customary, encased in a collar 29 which is enclosed in a sleeve 30. The collar 29 has formed therein a notch 29a. The steering lock device which constitutes part of the antitheft device according to the invention has a generally cylindrical, hollow housing 31. Within this hollow housing 31 are accommodated a locking member 32 to lock the steering shaft 28 through the notch 29a in the collar 29 and a sliding member 33 jointed to the locking member 32 by means of a spring 34. The sliding member 33 is at all times subjected to a compression by a spring 35 mounted between the sliding member 33 and the closed end of the housing 31. Thus, the locking member 32 connected with the sliding member 33 has a tendency to approach the steering shaft 28. Designate at 36 is a rotary member having a plunger 37 operating the slide member 33. The rotary member 37 is rotated by the rotation of a key 38 inserted into the lock cylinder 39 (FIG. 5). The detailed construction and operation of the locking device as shown are described in the aforesaid copending Application and, hence are being omitted.

According to the invention, however, the improved alarm switch 11 constructed as shown in FIGS 4a and 4b is used in the steering lock device in lieu of the switch 7 used in the prior art device shown in FIG. 1.

The switch 11 is mounted on the housing 31 through a hole 31a provided in the wall thereof in such a manner that the sliding member 33 is engageable with the leaf spring 25 as the member 33 slides back and forth in the housing 31. Behind the alarm switch 11 is mounted the engine switch 17 which is interlocked with the key cylinder 39.

When the key 38 and according the rotary member 36 are turned to their "drive" or "start" position, the ignition switch 17 acts to excite the solenoid coil 15a of the relay switch 15 (FIG. 2). The relay switch 15 is consequently opened to disconnect the alarming light or buzzer 16 from the power supply 13. Thus, the alarming light or buzzer 16 remains inoperative while the engine is operating, in whichever position the switches 11 and 12 may be held. If desired, the fuse box 14 may be connected directly to the alarming light or buzzer 16 without use of the relay switch 15, whereby the alarming light or buzzer 16 can be made operative when the door is opened, irrespective of the selected position of the key, unless the steering shaft is locked.

When, referring to FIG. 5a, the key and the rotary member 36 is turned to the "garage" position or to the "stop" position with the key kept inserted into the lock cylinder, the sliding member 33 is held in an elevated position against the section of the spring 35 to prevent to the locking member 32 from passing through the notch 29a in the collar 29. The sliding member 33 in this elevated position pressed the leaf spring 25 outwardly of the housing 31 until the moving contact 27 abuts to the stationary contact 26 (FIG. 4a). The switch 11 thus being closed, if the door switch 12 is closed as the door is opened as shown in FIG. 3b, the alarming light or buzzer 16 becomes energized from the power supply 13 to glow or produce alarming sounds.

If the key 38 is removed from the lock cylinder 39 after it has been turned to the "stop" position, then the sliding member 33 is forced toward the steering shaft 28 by the action of the spring 35 until it passes through the notch 29a in the collar 29 and lock the steering shaft 28. In this instance, the leaf spring 25 is released from the outer wall of the sliding member 33 so that the moving contact 27 is disengaged from the stationary contact 26 (FIG. 3a). The alarm switch 11 thus being open, the alarming light or buzzer 16 is not energized and remains inoperative even though the door switch 12 is closed as the door is opened.

It will now be understood that, even when the locking member 32 is malaligned with the notch 29a in the collar 29 and rest on the outer periphery of the sleeve 30, the leaf spring 25 can be released as the sliding member 33 leaves the spring to open the alarm switch 11. Thus, in the antitheft device according to the invention, it never happens that the alarming circuit connection is unwantedly closed although the locking member is held in a position ready to lock the steering shaft as soon as the steering shaft is rotated by, say, a thief.

The device incorporating the improvement according to the invention should therefore be noted for its increased reliability in informing the driver whether the steering shaft is locked or not and, as such, is advantageous for the purpose of preventing a motor vehicle from being stolen when the driver is absent.

We claim:

1. In a vehicle having an engine ignition switch, a steering shaft, and at least one door for entry into the vehicle and exit thereof, a theft-prevention device comprising, a key-operated unit mounted on said steering shaft or receiving a key for locking and unlocking said steering shaft and including a generally cylindrical hollow housing, a locking member slidably received in said housing, a sliding member connected with said locking member adjacent an end thereof for actuating said locking member to lock the steering shaft when said key is inserted in said unit and actuated to a selected position, an alarm switch mounted on said cylindrical housing operable to an opened and closed position by said sliding member, said switch being in a closed position when said steering shaft is in an unlocked condition, a door switch circuit completed when said door is opened, a door switch in said circuit operable by said door to close said circuit each time when said door is opened, an alarm means and a power source in series with said alarm switch and said door switch to produce alarm signals whenever said door is opened without said steering shaft being locked, and a relay switch in series with said alarm means having an operating coil connected to said ignition switch energized upon closing of said ignition switch, and opening said relay switch when energized upon closing of said ignition switch thereby rendering the alarm means ineffective.

2. The theft-preventing device as claimed in claim 1, wherein said alarm switch comprises a stationary contact connected to said door switch, a movable contact connected to said alarm means and normally disengaged from said stationary contact, a plunger mechanically connected to said movable contact, and a leaf spring normally spaced from said plunger, said leaf spring being pressed by said sliding member when said sliding member is held in position remote from the steering shaft to hold said moving contact in contact with said stationary contact and released from said sliding member as the sliding member draws nearer to the steering shaft to disengage said movable contact from said stationary contact.

3. The theft-preventing device as claimed in claim 1, wherein said door switch comprises, a housing defining a stationary contact, a plunger mounted in the last-mentioned housing and retracted in the housing when depressed by the wall of the door, and a movable contact mechanically connected with said plunger and isolated from said last-mentioned housing when said plunger is in its retracted position, and a spring causing said plunger to protrude from said housing as the door is opened to cause said movable contact to contact said last-mentioned housing, whereby the door switch is closed only when the door is opened.

* * * * *